United States Patent [19]
Shinomura

[11] 3,856,731
[45] Dec. 24, 1974

[54] WAXY COMPOSITION FOR PREVENTING RUBBERY SUBSTANCE FORM OZONE DETERIORATION AT MEDIUM AND/OR LOW TEMPERATURE

[76] Inventor: Toshihiko Shinomura, No. 438 Miyauchi, Kawasaki-shi, Kanagawa-ken, Japan

[22] Filed: Mar. 7, 1973

[21] Appl. No.: 338,799

[52] U.S. Cl. .............................. 260/28.5 B, 260/757
[51] Int. Cl. ....................... C08f 45/52, C08c 11/70
[58] Field of Search........ 260/28.5 B, 212, 635, 757

[56] References Cited
UNITED STATES PATENTS
3,112,285    11/1963    Phelan et al. ................... 260/285 B OTHER PUBLICATIONS
Rubber Chemistry & Technology, Ferris et al., Vol. 32: p. 379–393, 1959.
The Chemistry & Technology of Waxes, Warth, 1956, p. 404 relied upon.

Primary Examiner—Morris Liebman
Assistant Examiner—S. L. Fox
Attorney, Agent, or Firm—Blum, Moscovitz, Friedman & Kaplan

[57] ABSTRACT

A waxy composition containing 50 per cent or more by weight of normal chain hydrocarbons having from 26 to 29 carbon atoms, a method of utilizing said waxy composition for preventing rubbery substance from ozone deterioration at medium and/or low temperatures, and a rubbery article thus prevented from ozone deterioration at medium and/or low temperatures. The method comprises steps of mixing said waxy composition with raw rubber, subsequently vulcanizing the mixture, and leaving the vulcanized matter as it is for letting the waxy composition bloom on the surface of the matter. Results of some tests are disclosed.

3 Claims, 1 Drawing Figure

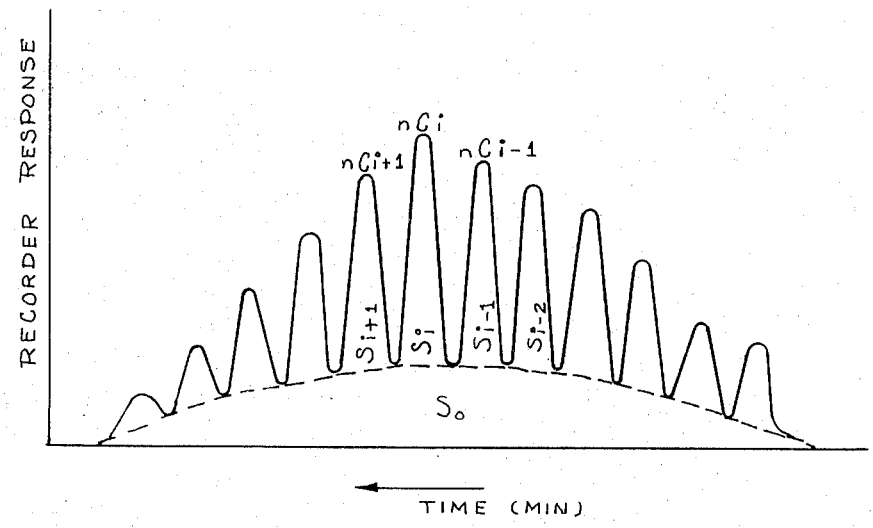

3,856,731

WAXY COMPOSITION FOR PREVENTING RUBBERY SUBSTANCE FORM OZONE DETERIORATION AT MEDIUM AND/OR LOW TEMPERATURE

BACKGROUND OF THE INVENTION

This invention relates to new and useful improvements in the prevention of ozone deterioration for the rubbery substance and more particularly to a waxy composition for preventing rubbery substance from ozone deterioration at medium and/or low temperatures, a method of utilizing the waxy composition of the class described, and a rubbery article thus prevented from ozone deterioration at medium and/or low temperatures.

Heretofore, it has been known that strained rubber substance is affected by a slight amount of ozone in air so as to be deteriorated, and cracks occur therein.

There are methods for preventing the cracks, which are generally classified into two. One is a method of adding particular aromatic diamine derivative or the like, so-called antioxidant. The other is a method of adding petroleum wax. In accordance with the former method, the antioxidant brought into the rubbery substance reacts with ozone so as to prevent the rubbery substance from ozone deterioration. In accordance with the latter method, in which wax is used, the wax blooms on the surface of the rubbery substance with the lapse of time so as to form a coating phase, whereby attack of ozone against the rubbery substance is prevented. In the latter method, a physical action as above is thus utilized. Of course, it is possible to concurrently use these two methods. However, the method of using wax is inexpensive, and, in addition, advantageous in that coloring does not occur thereby. Heretofore, as the wax of the class described, so-called high melting point petroleum paraffin wax or petroleum microcrystalline wax, having a melting point of a matter of from 63 to 83° C. as indicated in the JIS K 2521 has been used. However, the present inventor has found that performances of these waxes for preventing the ozone deterioration are not satisfactory, respectively, and studied the matter, resulting in this invention.

As a result of zealous study of the ozone deterioration preventing mechanism of wax for rubber by the present inventor, he has found an important fact. In view thereof, it has been found that all of the now available ozone deterioration preventing waxes have compositions appreciably deviating from the optimum composition, respectively. Under these circumstances, he produced the optimum composition and studied the same. As a study, it has been found that his product has performance which is distinguishably superior to those of the now available ozone deterioration preventing waxes. Thus the invention has been completed.

That is, the present inventor studied as follows: Wax was blended with rubber. Sheets were formed with the blended rubber and vulcanized. The vulcanized sheets were left as they were. Then the wax bloomed on the surface of the rubber sheets to form a wax phase which protects the rubber sheets from attack of ozone. Now it was found that the wax is fractionated in process of its diffusion in the rubber and separation onto the surface of the sheet and that, even if the originally used wax has whatever composition, components of the wax having specified numerical range of carbon atoms are separated onto the surface. It was solved that the fractionation mechanism is due to the facts that components of the wax having low molecular weight carbon atoms and molecules of the rubber are dissolved by each other so that the former is not separated onto the surface of the latter and that components of the wax having high molecular weight carbon atoms have slow diffusing velocities so that they also are not separated onto the surface of the rubber. Furthermore, it was studied that only such a components as having further specified numbers of carbon atoms among the components of the wax separated onto the surface of rubber are effective for preventing the ozone deterioration. It was solved that the effect is derived from selected forms of crystals. In addition, it was also solved that any branched chain hydrocarbon component among the components of the wax is not effective for preventing the ozone deterioration.

In view of the above facts, the present inventor and one other jointly invented a waxy composition having an extremely excellent performance in the region of temperature (about 40 – 60° C.) for testing the ozone deterioration in accordance with the JIS K 6301 of 1969, and for which a Japanese patent application No. 119997 of 1970 and a U.S. Pat. application Ser. No. 212,635 have been filed.

The primary object of this invention is to provide a waxy composition having a performance for extremely highly preventing ozone deterioration at medium and/or low temperatures, about $-10°$ to $40°$ C.

Another object of this invention is to provide a method of using the waxy composition for preventing rubbery substance from ozone deterioration at medium and/or low temperatures, about $-10°$ to $40°$ C.

Still another object of this invention is to provide rubbery articles thus prevented from ozone deterioration at medium and/or low temperatures, about $-10°$ to $40°$ C.

With the objects as above, the present inventor has further zealously studied influences of temperature at which rubber is left as it is, to the fractionation effect of the wax brought about by the rubber and influences of temperature at which rubber is left as it is, to the crystal form of the wax, resulting in that it has been researched that there is an interrelation of the pertinent region of the composition with temperature at which rubber product is left as it is, so that the former varies in accordance with variation in the latter. Thus a waxy composition having an extremely excellent performance in a region of a low temperature to a medium temperature (for example, about $-10°$ to $40°$ C.) has been invented.

SUMMARY OF THE INVENTION

In accordance with this invention, a waxy composition containing more than 50 percent by weight of normal chain hydrocarbons having from 26 to 29 carbon atoms is usable. It is unnecessary and improper that hydrocarbons having less than 26 and more than 29 carbon atoms are mixed within the composition in accordance with this invention, and substantial absence thereof is preferred. However, such a composition having more than 50 per cent by weight of normal chain hydrocarbons having 26 to 29 carbon atoms is capable of having sufficiently superior performance.

The production of the composition in accordance with this invention is not limited to a particular process. It is possible to produce a desired product by, for example, removing the light weight components and heavy weight components from heretofore well known petroleum wax by distillation.

Petroleum wax may be obtained by the following process. Crude oil is distilled under the ordinary pressure, yielding tower bottom oil, which is further distilled under a reduced pressure, yielding a fraction, from which aromatic components are removed by the solvent extraction using phenol, furfural, or the like. The residue is, preferably after being hydrofinished, further solvent-dewaxed with ketone, an aromatic mixed solvent, or the like, yielding dewaxed oil as a basic oil for a lubricating oil. As a by-product from the dewaxing step, crude wax is obtained. The crude wax is further deoiled by solvent, removing low fraction therefrom and yielding deoiled wax. Alternatively, the crude wax may be deoiled by the sweating process, yielding deoiled wax. The deoiled wax may be further purified by treating it with sulphuric acid, clay, or the like.

Although the desired wax composition in accordance with this invention may be obtained by distilling deoiled wax obtained by the usual process as above, it is preferred that, by selecting crude oil, which is the starting material, or when the fraction is obtained by distilling under a reduced pressure the tower bottom oil, which is the residue of distillation under the ordinary pressure, a narrow cut distillation is carried out so that the fraction substantially consists of hydrocarbons having from 26 to 29 carbon atoms.

Furthermore, as the wax composition in accordance with this invention, polyolefin oligomers obtained by the polymerization of olefins such as ethylene and the like, the thermal cracking products of polyolefins, waxes synthesized by the Fischer-Tropsch process, and compositions obtained from the oligomers, thermal cracking products, and synthesized waxes, as above, by subjecting them to distillation, extraction, and the like so that the composition has the required number of carbon atoms, may be used.

In order to quantify the content of the components of the waxy composition in accordance with this invention, the temperature elevating gas chromatography is used. chromatograms as exemplified in the accompanied drawing is obtained by the temperature elevating gas chromatography, in which a column (3 mm $\phi \times 1$ m) of a carrier of Chromosolv G (60 – 80 mesh) and liquid phase of Silicone (SE-52, 3%) is used at a temperature elevating velocity of 4° C./min. By comparing the chart with positions of peaks for various normal paraffins, numbers of carbon atoms for each peak are determined. Each composition is calculated from the following formulae, $$\left[S_o / \left(S_o + \sum_i S_i\right)\right] \times 100 \ (\%)$$

for branched paraffins and $$nC_i \left[S_i / \left(S_o + \sum_i S_i\right)\right] \times 100 \ (\%)$$

for each normal paraffin,
wherein $S_o$ denotes area of base part and $S_i$, $S_{i+1}$, $S_{i+2}$, ... denote areas of the peaks, respectively.

BRIEF DESCRIPTION OF THE DRAWING.

The accompanying drawing represents an example of chromatogram for the method of calculating quantities of components contained in the waxy composition in accordance with this invention, as referred to hereinbefore.

DESCRIPTION OF THE PREFERRED EMBODIMENTS.

Now this invention will be more concretely explained in the following examples, in which the term "rubber" represents natural rubber, SBR, Alfin rubber, and the like.

EXAMPLE 1

Various kinds of waxes were blended in SBR 1712 together with various other vulcanizing agents, respectively. Pieces of the blended rubber sheets were vulcanized. The pieces were fixed to various elongations and subjected to the ozone deterioration test, where the ozone deterioration preventing performance was searched by measuring the critical strain. The Table 1 shows the results of the search, where those for marketing waxes are united.

As clearly shown from the results of the search, it is to be seen that, in case the wax composition in accordance with this invention is used, the ozone deterioration preventing performance is extremely excellent. The marketing waxes illustrated for comparison have low critical strains and inferior ozone deterioration preventing performance, respectively.

The blending recipe and the vulcanizing condition for the above production of the rubber sheets are as follows:

| Blending Recipe | | Vulcanizing Condition |
|---|---|---|
| Rubber | 100 | 150°C. |
| Zinc white | 5 | 30 min. |
| Stearic acid | 1 | |
| H A F | 40 | |
| Vulcanization accelerator CZ | 1 | |
| Sulphur | 2 | |
| Wax | 2 | |

Table 1

Interrelation of Composition of Various Waxes to Ozone Deterioration Preventing Performance.

| Waxes | Composition of Wax | | | | Ozone Deterioration Preventing Performance (Critical Strain*1) | |
|---|---|---|---|---|---|---|
| | Branched | $nC_{25}$ or less | $nC_{26}$ — $nC_{29}$ | $nC_{30}$ or more | 10° C. | 30° C. |
| | Compared Samples | | | | | |
| Marketing A | 35.6% | 0% | 5.8% | 58.6% | 10% | 20% |
| Marketing B | 23.0 | 1.3 | 18.9 | 56.8 | 20 | 20 |
| Marketing C | 9.8 | 2.7 | 39.1 | 48.4 | 30 | 30 |

Table 1—Continued

Interrelation of Composition of Various Waxes to Ozone Deterioration Preventing Performance.

| Waxes | Composition of Wax | | | | Ozone Deterioration Preventing Performance (Critical Strain*1) | |
|---|---|---|---|---|---|---|
| | Branched | $nC_{25}$ or less | $nC_{26}$ — $nC_{29}$ | $nC_{30}$ or more | 10°C. | 30°C. |
| *Compared Samples* | | | | | | |
| Marketing D | 0 | 0 | 18.9 | 81.1 | 20 | 20 |
| Marketing E | 26.3 | 8.6 | 16.9 | 48.2 | 20 | 20 |
| Marketing F | 33.5 | 4.6 | 12.4 | 49.5 | 20 | 20 |
| Marketing G*2 | 0 | 3.7 | 25.5 | 70.8 | 20 | 20 |
| *Produced Samples in Example 1* | | | | | | |
| Produced Sample H | 12.4 | Trace | 52.7 | 34.9 | 40 | 50 |
| Produced Sample I | 0 | Trace | 58.6 | 41.4 | 40 | 50 |
| Produced Sample J*2 | 0 | Trace | 78.2 | 21.8 | 50 | 50 |
| Produced Sample K*2 | 0 | Trace | 89.6 | 10.4 | 50 | 60 |

*1 The ozone deterioration preventing performance is judged by the state of crack which occurs on samples elongated and fixed to various strains and exposed in an atmosphere having an ozone concentration of 50 pphm at each above-mentioned temperature for 5 hours. The critical strain $i_c$ means the minimum strain whereby a crack occurs in the above test, so that the larger the critical strain, the more excellent the ozone deterioration preventing performance is.

*2 Wax produced by polymerizing ethylene (low molecular weight polyethylene).

EXAMPLE 2

The produced sample I, the produced sample J and the produced sample K were blended in various rubbers together with vulcanizing agents similarly to the Example 1 and vulcanized, yielding pieces of rubber sheets, which were tested in connection with the ozone deterioration preventing performance. The Table 2 shows the excellent results of the test.

Table 2

Ozone Deterioration Preventing Performance of the Produced Samples in Various Rubbers.

| Waxes | Rubbers, the Object of the Test | Ozone Deterioration Preventing Performance (Critical Strain) | |
|---|---|---|---|
| | | 10° C. | 30° C. |
| Produced Sample I | Solution polymerization BR, oil extended (JSR BR31) | 50% | 50% |
| | Emulsion polymerization SBR (JSR 1500) | 50 | 50 |
| | Solution polymerization SBR, oil extended (Tufdene 1530) | 40 | 50 |
| Produced Sample J | JSR BR31 | 60 | 50 |
| | JSR 1500 | 60 | 50 |
| | Tufdene 1530 | 50 | 50 |
| Produced Sample K | JSR BR31 | 60 | 50 |
| | JSR 1500 | 50 | 60 |
| | Tufdene 1530 | 50 | 50 |

It is to be understood that the above particular description is by way of illustration and that changes, omissions, additions, substitutions, and/or modifications might be made within the scope of the claims without departing from the spirit of the invention which is intended to be limited only as required by the prior art.

What is claimed as new and desired by letters Patent of the United States is:

1. A method of preventing a rubbery substance selected from the group consisting of natural rubber, styrene-butadiene rubber, butadiene rubber and Alfin rubber from ozone deterioration at temperatures between −10°C and 40°C, consisting essentially of the steps of mixing a waxy composition with said rubbery substance in raw state, said waxy composition containing at least 50 per cent by weight of normalchain saturated hydrocarbons having from 26 to 29 carbon atoms, the remainder of said wax being essentially free of aromatic components, aliphatic unsaturates and components removable by deoiling which selectively removes lower molecular weight fractions, subsequently vulcanizing said mixture, and leaving said vulcanized mixture as it is for letting said waxy composition bloom on the surface of said vulcanized mixture.

2. A rubbery article of a rubber selected from the group consisting of natural rubber, styrenebutadiene rubber, butadiene rubber and Alfin rubber protected from ozone deterioration at temperatures between −10°C and 40°C by reason of the presence therein of a waxy composition with said rubbery substance in raw state, said waxy composition containing at least 50 per cent by weight of normal chain saturated hydrocarbons having from 26 to 29 carbon atoms, the remainder of said wax being essentially free of aromatic components, aliphatic unsaturates and components removable by deoiling which selectively removes lower molecular weight fractions.

3. A rubber composition comprising 100 parts of a rubber substance selected from the group consisting of natural rubber, styrene-butadiene rubber, butadiene rubber and Alfin rubber and about 2 parts of a wax, at least 50% of said wax consisting of straight chain saturated hydrocarbons, said hydrocarbon chains containing 26 to 29 carbon atoms, the remainder of said wax being essentially free of aromatic components, aliphatic unsaturates and components removable by deoiling which selectively removes lower molecular weight fractions.

* * * * *